(12) United States Patent
Dobler et al.

(10) Patent No.: US 9,767,715 B2
(45) Date of Patent: Sep. 19, 2017

(54) REMOVABLE FRAGRANCE SAMPLER

(71) Applicants: Per Dobler, Huntington, NY (US); Valeriano Marinelli, Port Washington, NY (US); Sven Dobler, Huntington, NY (US)

(72) Inventors: Per Dobler, Huntington, NY (US); Valeriano Marinelli, Port Washington, NY (US); Sven Dobler, Huntington, NY (US)

(73) Assignee: Orlandi, Inc., Farmingdale, NY (US)

( * ) Notice: Subject to any disclaimer, the term of this patent is extended or adjusted under 35 U.S.C. 154(b) by 0 days.

(21) Appl. No.: 14/756,971

(22) Filed: Nov. 3, 2015

(65) Prior Publication Data
US 2016/0133166 A1 May 12, 2016

Related U.S. Application Data

(60) Provisional application No. 62/123,114, filed on Nov. 7, 2014.

(51) Int. Cl.
| | |
|---|---|
| *B32B 3/08* | (2006.01) |
| *B32B 7/06* | (2006.01) |
| *B32B 7/12* | (2006.01) |
| *B32B 37/00* | (2006.01) |
| *A45D 37/00* | (2006.01) |
| *A45D 40/00* | (2006.01) |
| *G09F 5/04* | (2006.01) |
| *B32B 38/00* | (2006.01) |
| *B32B 37/26* | (2006.01) |

(52) U.S. Cl.
CPC ............... *G09F 5/04* (2013.01); *A45D 37/00* (2013.01); *A45D 40/0087* (2013.01); *B32B 3/08* (2013.01); *B32B 7/06* (2013.01); *B32B 7/12* (2013.01); *B32B 37/0076* (2013.01); *B32B 38/145* (2013.01); *B32B 2037/268* (2013.01); *B32B 2439/62* (2013.01); *G09F 2005/041* (2013.01); *G09F 2005/046* (2013.01)

(58) Field of Classification Search
CPC .... B32B 3/08; B32B 7/06; B32B 7/12; B32B 37/00; B32B 37/0076; G09F 2439/40; G09F 2439/80; G09F 2005/04; G09F 2005/046; A45D 37/00; A45D 40/00; A45D 40/0087; Y10T 428/24851; Y10T 428/2486; Y10T 428/249995
USPC ........... 428/201, 202, 321.1, 321.5; 206/734, 206/484, 828
See application file for complete search history.

(56) References Cited

U.S. PATENT DOCUMENTS

| | | | | |
|---|---|---|---|---|
| 5,928,748 A | * | 7/1999 | Jones | A45D 40/0087 239/34 |
| 6,063,229 A | * | 5/2000 | Miles | B65H 33/00 156/277 |
| 6,740,379 B1 | * | 5/2004 | Congard | C09J 7/0246 156/247 |

\* cited by examiner

*Primary Examiner* — Bruce H Hess
(74) *Attorney, Agent, or Firm* — Paul M Denk

(57) ABSTRACT

A removable fragrance sampler is disclosed in which the sampler comprises a bottom ply having an upper surface and a lower surface with the lower surface having a layer of re-positionable pressure sensitive adhesive and a top ply having a sample material therein, the top ply being attached to the upper surface of the bottom ply, and the bottom ply being larger than the top ply.

6 Claims, 2 Drawing Sheets

REMOVABLE FRAGRANCE SAMPLER

CROSS REFERENCE TO RELATED APPLICATION

This regular letters patent application claims priority to the provisional patent application having Ser. No. 62/123,114, filed on Nov. 7, 2014.

FIELD OF THE DISCLOSURE

This disclosure generally relates to a fragrance sampler and more particularly to a fragrance sampler that may be easily removed from printed matter such as newspaper stock.

BACKGROUND

Newspapers may have promotional advertising labels which are removable from a front page or other pages of the newspaper. It is also possible that such labels are attached to pages of other publications such as a catalog or a magazine. These labels are used to advertise or promote various products or services or to sometimes identify that the publication is being provided as a courtesy copy from the establishment providing the copy. These labels are typically made from conventional clay coated label papers which are printed on a top side and treated on a bottom side with a pressure sensitive adhesive. The labels are delivered on either paper based or plastic based liners that are properly constructed and chosen for easy release during subsequent affixing to the pages of publication material.

The pressure sensitive adhesive used on these labels is designed so that it adheres to the liner and later to the publication substrate. The adhesive also allows the label to be removed or repositioned without tearing the fibers or removing ink to the point of impairing legibility or affecting underlying copy. This is an important feature since newsprint paper is not coated. Newsprint paper has exposed fibers on its surface and its internal bond strength is much weaker than in magazines in comparison. Adhesives used for repositioning is achieved by formulations whereby impurities are added to either water based or solvent based adhesives to deaden or weaken the adhesive nature of the materials. Additionally, pattern coating is used to apply these adhesives to create areas of bonding and areas of no bonding. These combinations are used to perfect the adhesion and repositionability desired on a given substrate.

These promotional labels are typically affixed either during the newspaper printing or during the overhead, folded newspaper transport between printing and final packing or bundling operations. The labels on the liners are presented fan-folded or on rolls for continuous splicing and affixing to the publication in the existing work flow.

There are also multiple ply or multi-ply constructed labels defining a well or containment area. The containment area is filled with a sample material such as a fragrance or a cosmetic sample. These labels are constructed from combinations of paper, plastic, and aluminum foil composites with adhesives or heat seal coatings or treatments chosen for their ability to contain the various chemicals found in the sample materials. The sample material is trapped within the plies of the constructed label. These sample labels are typically affixed on 70 pound or 80 pound clay coated text weight paper stocks that are printed and then delivered with the affixed labels as an insert into magazines. Sample labels are also placed on printed cover stock weight printed papers for use as hand out cards in pharmacies and department stores to offer a real product sample to consumers. These samples have never been directed applied to newspapers. Given the liquid nature of the filled materials and in order to withstand burst pressures in handling, the seals of these labels must be strong. As a result of this, the adhesive used on the bottom of the filled sample label must be permanently attached to the carrier substrate. The seal strength of the label plies must be weaker than the adhesive of the label to the carrier substrate; otherwise the label would separate from the carrier before opening and would not allow access to the sample materials.

In an effort to offer fragrance or cosmetic samples in newspapers, such sample filled labels have been applied as samples on the top of traditional re-positionable labels in a "piggy-back style." The sample label with conventional permanent adhesive is affixed on top of the base promotional label treated with re-positionable adhesives as above indicated. The combined labels are then applied in the traditional fashion to the front of newspapers where the labels can be removed and then the filled sample label can be opened away from the publication leaving the publication intact. Upon opening the filled sample label, the bottom ply of the sample label is still connected and attached to the top of the promotional carrier label.

This may be acceptable from an advertising and sampling perspective, but it is expensive and logistically very difficult to produce or manufacture. The process requires the separate printing and manufacturing of two labels, the sample label in addition to the promotional carrier label, and then the additional step of affixing the sample label to the carrier label. All of these steps require additional time and increase the cost of manufacturing the product. The complexity of the process is also increased in that it is difficult to color match and register the positioning of the artwork from the top of the sample label to the top of the carrier label.

The removable fragrance sampler of the present disclosure is designed to obviate and overcome many of the disadvantages and shortcomings experienced with prior sample labels. Moreover, the present disclosure is related to a removable fragrance sampler that can be easily removed, re-positioned, or adjusted on printed matter without destroying or impairing any printing or graphics on the printed matter.

SUMMARY OF THE DISCLOSURE

In one form of the present disclosure a removable fragrance sampler is disclosed in which the sampler comprises a bottom ply having an upper surface and a lower surface with the lower surface having a layer of re-positionable pressure sensitive adhesive and a top ply having a sample material therein, the top ply being attached to the upper surface of the bottom ply, and the bottom ply being larger than the top ply.

In light of the foregoing comments, it will be recognized that the present disclosure provides a removable fragrance sampler that is easily removed from a newspaper or magazine and does not destroy the newspaper upon removal.

The present disclosure provides a removable fragrance sampler that can be easily employed with highly reliable results and can be positioned on a substrate such as a newspaper or magazine.

The present disclosure also provides a removable fragrance sampler that may be produced on conventional label making equipment.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
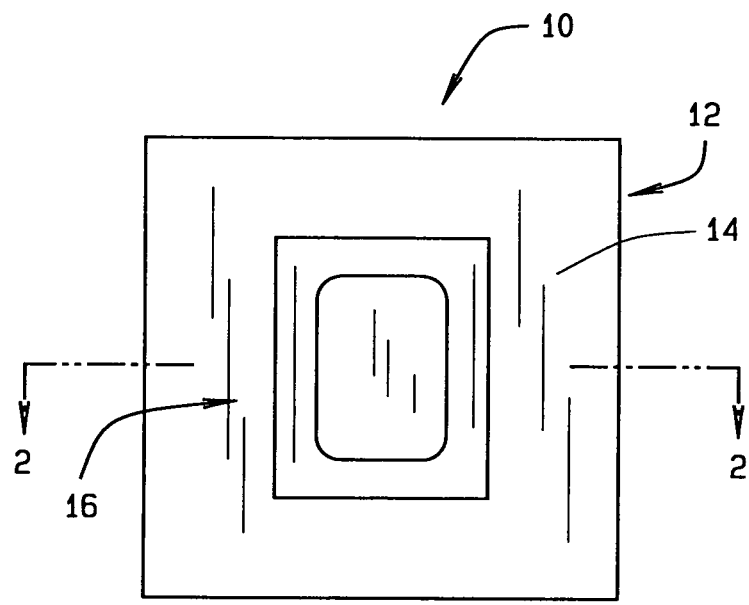
FIG. 1 is a top perspective view of a removable fragrance sampler constructed according to the present disclosure.

Referring now to the drawings, wherein like numbers refer to like items, number 10 identifies a preferred embodiment of a removable fragrance sampler constructed according to the present disclosure. With reference now to FIG. 1, the removable fragrance sampler 10 comprises a first or bottom ply 12 having a top surface 14 to which is adhered a second or top ply 16. The top ply 16 may be comprised of multiple plies and contain a sample material, as will be explained more fully herein. The bottom ply 12 and the top ply 16 may be formed from materials such as paper, plastic, thermoplastics, polymer materials, synthetic materials, films, foils, polyethylene laminated structures, or aluminum containing structures or combinations and compositions thereof. The top ply 16 may be adhered to the bottom ply 12 by heat sealing or by use of an adhesive. The bottom ply 12 is dimensionally larger than the top ply 16. By way of example only, the bottom ply 12 may be 5% larger than the top ply 16. Although not shown in this particular view, it is possible and contemplated that the bottom ply 12 and the top ply 16 may have printed matter, graphic designs, decorations, or embossing incorporated thereon. For example, the top ply 16 may have a logo or a trademark for the sample material contained therein and the bottom ply 12 may have other information, such as contact information, concerning the sample material.

Figure 2:
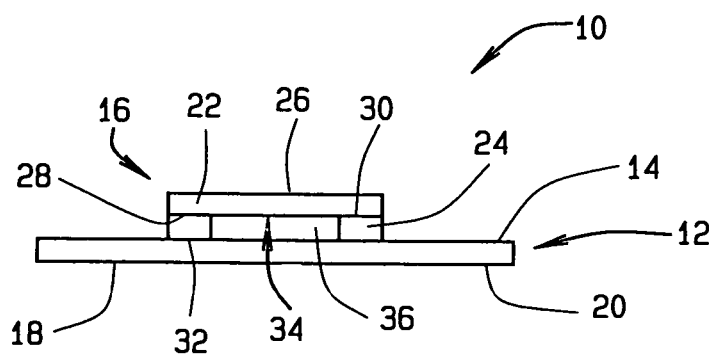
FIG. 2 is cross-sectional view of the removable fragrance sampler shown in FIG. 1 taken along the plane of line 2-2.

FIG. 2 is a cross-sectional view of the removable fragrance sampler 10. The bottom ply 12 has the upper surface 14 and a lower surface 18. A layer of re-positionable pressure sensitive adhesive 20 is provided on the lower surface 18. The layer 20 allows the sampler 10 to be positioned and re-positioned on newspaper for easy removal without damaging the newspaper. The top ply 16 may comprise an upper portion 22 sealed, adhered, or connected to a lower portion 24. The upper portion 22 has a top side 26 and a bottom side 28. The lower portion 24 has a top side 30, a bottom side 32, and a well 34. The well 34 contains a sample material 36, such as a fragrance containing substance, a cosmetic, or a pharmaceutical preparation. The upper portion 22 and the lower portion 24 engage each other to form a liquid tight seal to retain the sample material 36 in the well 34. In order to gain access to the sample material 36 within the well 34, the upper portion 22 is separated or peeled away from the lower portion 24. The bottom side 32 of the top ply 16 is connected to or sealed to the upper surface 14 of the bottom ply 12. As discussed, the top ply 16 is proportionally smaller than the bottom ply 12. The top ply 16 is sealed or attached to the bottom ply 12 with sufficient strength so that the sample material 36 is contained within the well 34 during manufacturing, transporting, and use of the sampler 10. Other constructions of the upper ply 16 are possible.

As can be appreciated, the sampler 10 may be removed from a newspaper by grasping the bottom ply 12 and removing the entire sampler 10 from the publication. Once removed, the upper portion 22 may be opened to reveal the sample material 36 within the well 34. If, for some reason, the sampler 10 needs to be reattached or repositioned on the newspaper, the sampler 10 may be placed on the newspaper and the layer 20 will adhere the sampler 10 in place.

Figure 3:
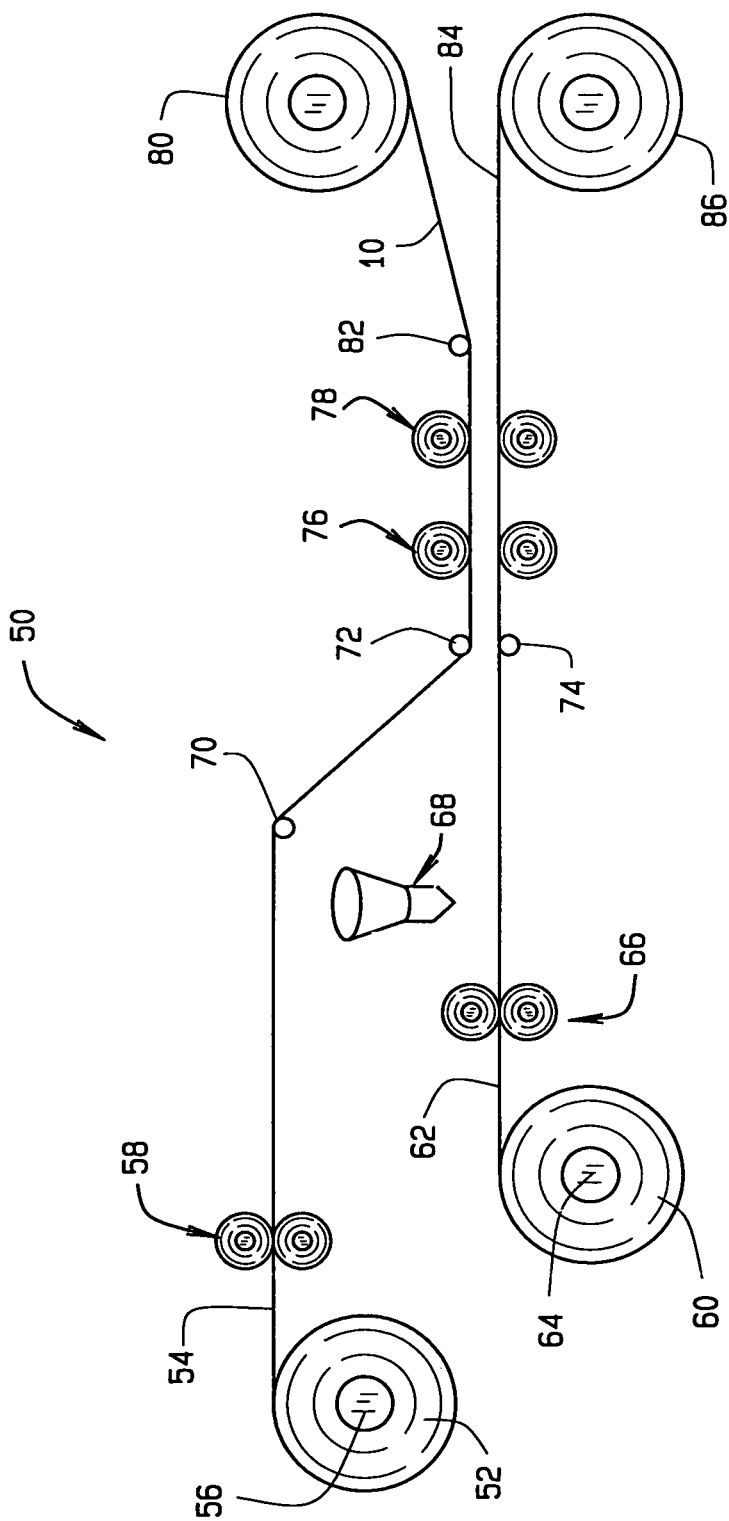
FIG. 3 is a schematic diagram of a process for manufacturing the removable fragrance sampler constructed according to the present disclosure.

With reference now to FIG. 3, a process or method 50 for manufacturing the removable fragrance sampler 10 is shown schematically. A web 52 of a bottom ply material 54 is originally contained on a roller 56. The bottom ply material 54 has a plurality of the bottom ply 12 thereon. The bottom ply material 54 is pulled off or unwound from the roller 56 and passed through a printing station 58. At the printer station 58 desired graphics are printed on the material 54. For example, graphics may be printed on each top surface 14 of each bottom ply 12. A web 60 of a top ply material 62 is contained on a roller 64. The top ply material 62 has a plurality of the top ply 16 thereon. The top ply material unwinds from the roller 64 and passes through a printing station 66. Desired graphics are printed on the top ply material 62 at the printer station 66. Each top side 26 of each top ply 16 may have graphics or other matter printed thereon. As the bottom ply material 54 is being processed, the top ply material 62 is also being processed.

The top ply material 62 is passed under an injection station 68 where the sample material 36, such as a liquid fragrance sample, is deposited in each well 34 associated with each top ply 16. It is also possible that the sample material can be deposited in any other desired manner, such as extrusion, spray, flexographic equipment or silkscreen.

A first roller 70 and a second roller 72 direct the bottom ply material 54 down toward the top ply material 62 to bring the bottom ply material 54 into close proximity with the top ply material 62. A roller 74 is also used to direct the top ply material 62 toward the bottom ply material 54. The path of travel of the top ply material 62 is preferably substantially horizontal, at least after the sample material 36 has been deposited in the well 34, to avoid spilling of the sample material 36. However, the process 50 could be designed so that the bottom ply material 54 is brought up to the top ply material 62.

The bottom ply material 54 and the top ply material 62 are then passed through a sealing station 76 where each top ply 16 is adhered to a corresponding bottom ply 12. As can be appreciated, the bottom ply material 54 and the top ply material 62 may move at an indexed rate such that when the two materials 54 and 62 are brought together at the sealing station 76, the top ply 16 will be in alignment with the bottom ply 12. The sealing station 76 may be a heat sealer, and the top ply 16 and the bottom ply 12 can be adhered or sealed together for example, by welding, such as friction, sonic, or ultrasonic welding, or other standard heat sealing processes which will create a seal between the two plies 12 and 16. Alternatively, the sealing station 76 can utilize an adhesive, such as cationic cure coating adhesives, traditional cohesive seals, or adhesive seals, which will bind the top ply 16 and the bottom ply 12 together. The top ply 16 may also be adhered to the bottom ply 12 by lamination or sonic seal. Once the top ply 16 is adhered to the bottom ply 12, the joined ply materials 54 and 62 are passed to a multilevel rotary die-cut station 78 is encountered. The die-cut station 78 may be a multilevel rotary die-cut station or two sequential rotary die-cut stations to kiss-cut the bottom ply material 54 down to liner level and to kiss-cut the top ply material 62 down to liner level and dimensionally 5% or more smaller than the die-cut shape of the bottom ply 12. The die-cutting step can be performed with flat bed equipment. The formed removable fragrance samplers 10 are then collected on a product roller 80 by being directed upwardly by a roller 82. The removable fragrance samplers 10 may be delivered in roll form for automatic applications to other printed materials, such as being placed on a newspaper or a magazine. The samplers 10 can also be fan-folded for final affixing later onto a publication or newspaper. The die-cutting station 78 can also form perforations between adjacent samplers 10 to facilitate separation of the samplers 10. Waste material 84 can be collected on a waste roller 86 to be discarded.

The layer of re-positionable pressure sensitive adhesive 20 may have a release liner that is used so that the sampler 10 can later be readily applied to another substrate, such as a newspaper or a magazine, using affixing equipment. The layer of re-positionable pressure sensitive adhesive 20 can be applied to the bottom ply 12 either as a pre-treatment or after the passing the printing station 58.

It is also possible that the bottom ply material 54 and the top ply material 62 may be preformed or pre-printed offline to produce the continuous web 52 of bottom ply material 54 to be placed on the roller 56 and the continuous web 60 of top ply material 62 to be placed on the roller 64. As can be appreciated, the two webs 52 and 60 are threaded into machinery, such that when they are brought together at the sealing station 76, the bottom ply material 54 and the top ply material 62 will be in register.

From all that has been said, it will be clear that there has thus been shown and described herein a removable fragrance sampler. It will become apparent to those skilled in the art, however, that many changes, modifications, variations, and other uses and applications of the subject removable fragrance sampler are possible and contemplated. All changes, modifications, variations, and other uses and applications which do not depart from the spirit and scope of the disclosure are deemed to be covered by the disclosure, which is limited only by the claims which follow.

What is claimed is:

1. A removable sampler for holding a sample material comprising:
    a bottom ply having an upper surface and a lower surface, with the lower surface having a layer of re-positionable pressure sensitive adhesive applied thereto;
    a top ply having an upper portion and a lower portion for said top ply, said lower portion having a well formed therein, and said lower portion well provided for containing a sample material therein;
    said lower portion having a lower surface that is sealed to the upper surface of the bottom ply, and the bottom ply is larger than the top ply by at least five percent;
    said top portion of the top ply temporarily adhering with the bottom portion of said top ply to form a liquid seal therewith, and said upper portion of said top ply may be separated or pulled away from the lower portion and the bottom ply to attain access to the sample material contained therein;
    a carrier sheet in the form of a newspaper, magazine, or sampler card provided for temporary adherence of said removable sampler therewith or for its removal therefrom; and
    said bottom ply being formed from one of paper, plastic, thermoplastics, polymers, films, or foils.

2. The removable fragrance sampler of claim 1 wherein the sample material is a fragrance.

3. The removable fragrance sampler of claim 1 wherein the sample material is a cosmetic.

4. The removable sampler of claim 1 wherein the sample material is a pharmaceutical formulation.

5. The removable sampler of claim 1 wherein the bottom portion of the top ply is heat sealed to the bottom ply, with the top portion of the top ply capable of being separated or peeled away from the lower portion and bottom ply during usage of the sampler.

6. The removable sampler of claim 1 wherein said bottom ply and top ply capable of receiving printed matter, graphic designs, decorations, or embossing incorporated thereon for enhanced display.

* * * * *